(12) United States Patent
Leonard

(10) Patent No.: US 7,442,128 B2
(45) Date of Patent: Oct. 28, 2008

(54) ADAPTIVE DRIVE SHANK FOR DRIVING A TAP TOOL WITH A SOCKET AND RATCHET

(76) Inventor: Steven Carl Leonard, 3010 Belmont Pl. SW., Canton, OH (US) 44710

( * ) Notice: Subject to any disclaimer, the term of this patent is extended or adjusted under 35 U.S.C. 154(b) by 98 days.

(21) Appl. No.: 11/472,579

(22) Filed: Jun. 22, 2006

(65) Prior Publication Data

US 2007/0298892 A1    Dec. 27, 2007

(51) Int. Cl.
*B21J 13/02* (2006.01)
*B23B 31/00* (2006.01)
(52) U.S. Cl. .................. 470/198; 470/96; 279/143; 408/239 A
(58) Field of Classification Search .............. 470/96, 470/198; 403/300, 306; 279/143, 144, 145; 408/120, 231, 239 R, 239 A, 712
See application file for complete search history.

(56) References Cited

U.S. PATENT DOCUMENTS

| 1,088,855 | A | * | 3/1914 | Waiz ......................... 408/238 |
| 2,279,310 | A | * | 4/1942 | Gray .......................... 279/78 |
| 2,286,088 | A |  | 6/1942 | Harrell |
| 3,456,534 | A |  | 7/1969 | Williams |
| 3,653,780 | A |  | 4/1972 | Ammatuna |
| 4,081,873 | A | * | 4/1978 | Lemanski .................... 470/83 |
| 5,213,347 | A | * | 5/1993 | Rulon et al. ................ 279/102 |
| 5,690,445 | A | * | 11/1997 | Wu ........................... 403/306 |
| 5,876,158 | A | * | 3/1999 | Beiter ....................... 408/139 |
| 6,511,268 | B1 | * | 1/2003 | Vasudeva et al. ......... 408/239 R |
| 6,668,784 | B1 | * | 12/2003 | Sellers et al. ............. 123/193.5 |
| 7,014,397 | B2 |  | 3/2006 | Phillips |
| 7,117,765 | B1 | * | 10/2006 | Wallden ....................... 81/60 |

* cited by examiner

*Primary Examiner*—Edward Tolan
(74) *Attorney, Agent, or Firm*—Raymond M. Galasso; Galasso & Associates, LP

(57) ABSTRACT

An adaptive drive shank is provided for adapting a thread cutting tap tool to be driven by a conventional standard size hexagonal socket and ratchet drive. Various embodiments additionally provide color coded cutting thread tap tools adapted to lockably engage with the adaptive drive shank and have color coding identifying the taps tool thread standard. The tap tool comprises an elongated body having a thread cutting portion proximate a first end, a square drive head formed on the body at an opposing second end, and a shank portion interposed between and joining the thread cutting portion and the square drive head. The adaptive drive shank comprises an elongated shank body provided with a tap shank receiving hole through a tap tool side of the body, the receiving hole is sized to receive the square drive head and shank portion of a tap tool. The tap tool is lockably engaged in the adaptive drive shank by two opposing set screws.

11 Claims, 6 Drawing Sheets

ADAPTIVE DRIVE SHANK FOR DRIVING A TAP TOOL WITH A SOCKET AND RATCHET

FIELD OF THE DISCLOSURE

The disclosures made herein relate generally to apparatus for adapting a tool to be driven by a ratchet drive, and more particularly to adaptive drive shanks for rotatably and torsionally driving thread cutting tap tool using conventional standard sized sockets and ratchet drives for such sockets.

BACKGROUND

Thread cutting taps for cutting circumferential threads into a cored to bored hole in a work piece are well known. The tap tool cuts a thread into the inside wall of a generally cylindrical hole, creating a female ridged surface which functions like a nut, wherein the ridge or land shape, heights and spacing and flutes there between normally follow one of several widely adopted thread standards. Taps are commonly available having a substantially cylindrical shank portion with a thread cutting portion on one end and a square drive head on the opposing end of the shank, although this configuration is not exclusively definitive. The thread cutting portion comprises a series of raised lands with flutes spaced between. The lands have hardened circumferential thread cutting portions formed thereon. The taps are available in various standard diameters, both english and metric (although also not limited to these), and are available having cutting thread portions configured to tap a bored hole with a thread according to national or international thread standards. For example, the American National Standards Institute (ANSI) has around a dozen different thread designations such as NPT or national pipe thread which is a U.S. standard for tapered threads, originally used to join steel or brass pipe and fittings. Other standards include M which is a metric screw thread compliant with ISO standards, several unified inch screw threads such as UNR for unified inch screw thread, UNRC which refers to the unified inch screw thread for coarse threads, among many others to numerous to name here. Similarly there are many ISO standard threads, some of which overlap the ANSI standards. To serve this need, tap tools are commonly available in standard body configurations for threading various standard diameter holes with various standard thread types.

The success of any tapping operation depends entirely on the use of the correct type tap together with proper hole preparation and having a tap drive means providing sufficient torque to form the threads within the bore wall, particularly into structurally hard components such as steel. As can be understood, the amount of torque required to tap the hole varies greatly based upon the material type being tapped, for example less torque is generally required to form threads into plastic materials than into steel. The torque is also affected by the quality of the tool used to ream the hole. Dull drills or reamers can work harden metallic surfaces thereby requiring additional torque to cut the threads with the tap tool. Also worn drills can result in undersized holes, again requiring additional torque to tap the hole.

Standard size taps of reasonable diameter are commonly driven by 'T' handle tap holders. Such tap holders receive the tap tool into an opening in the tool wherein the hole can be threaded with the tap by twisting the 'T' handle to drive the tap tool into the hole. Such conventional tap tools have drawbacks, however.

One drawback is that the conventional 'T' handle on a typical tap tool holder is of limited length, providing limited leverage for driving the tap into material. This limited leverage is problematic particularly in cases requiring substantial torque to twist the tap into the hole to cut the threads. Required torque is further aggravated by the hole and tool conditions outlined above and is also higher when the material being tap threaded is a hard material such as steel.

Another drawback of conventional 'T' handle tap tool holders is that the arms of the 'T' handle prevent the tapping of hole which is located near any obstacle or obstruction that would prevent the 'T' handle from rotating freely, such as when the hole is near a wall or other nearby obstruction.

Therefore, a tool for tapping a hole that overcomes the limitation of the prior art, that provides a means of applying additional torque to the tap for cutting threads into hard materials, a tool that accepts a variety of standard diameter and thread type taps, a tool that is configured to be driven by a standard socket set socket and ratchet drive without purchasing a special purpose driver, such a ratchet driven tool for tapping a hole would be useful and novel.

SUMMARY OF THE DISCLOSURE

Accordingly, embodiments of the inventive disclosures made herein comprise a ratchet driven tool for tapping or threading a hole in a work piece.

In embodiments of the inventive disclosures made herein, a ratchet driven tool for tapping a hole comprises a tap tool for cutting circumferential threads into the wall of a hole together with a drive shank adapted to be driven by a conventional ratchet and socket of a socket wrench set. The tap tool comprises an elongated body having a thread cutting portion near one end of the tool, a square drive head formed on the body at an opposing end, and a shank portion interposed between and joining the thread cutting portion and the square drive head. The adaptive drive shank comprises an elongated shank body provided with a tap shank receiving hole through a tap tool side of the body. The receiving hole is sized to receive the square drive head and shank portion of the above tap tool body into the adaptive drive shank. The shank body has two opposing threaded holes through opposing sidewalls of the shank body. The opposing threaded holes extend into the shank receiving hole so they abut the square drive head of the tap tool when the tap tool is inserted into the drive shank. Each of the opposing threaded holes is provided with one set screw where the set screws are sized to be threadably received into the threaded holes and are of sufficient length as to be compressively and frictionally engageable against the side walls of the square drive head so as to positionally and rotationally lock the tap tool body to the adaptive drive shank. The elongated shank body has a hexagonal drive head secured at the driven end of the shank body. The drive head sized and adapted to engage with and be driven by a standard size hexagonal socket of a socket ratchet wrench set. Ratchets are available in a variety of ratchet handle lengths. The relatively long handle on the ratchet provides leveraged torque to the adaptive drive shank and tap tool so as to drive the tap tool into the hole of the work piece to cut the circumferential threads in the side wall of the hole. The use of the socket ratchet set with the adaptive drive shank adapts the tap tool for threading a hole in close proximity to a wall or tight corner or other nearby obstruction where a standard 'T' handle tap tool holder would not be of service.

In at least one embodiment the drive shank comprises 1020 cold rolled hexagonal steel stock.

In at least one embodiment the drive shank has an overall length from the tap side to the driven end of the drive shank of between 1.5 and 2 inches and the set screws are ⅜ inch diameter having 16 threads per inch.

In at least one embodiment the hexagonal drive head is provided with a precision bore sized to tightly and removably receive a dowel pin into the drive head. The bore and dowel pin sized to achieve a tight tolerance precision fit when the dowel pin is inserted into the precision bore in the drive head. The dowel pin is sized to have approximately ¼ of its length outside the drive head after insertion. The dowel pin is an aid to starting the hole tap in a properly aligned orientation. When starting a hole, the dowel pin may be inserted into the chuck of a drill press and the opposing end of the dowel pin is inserted into the precision fit bore of the drive head. The drill press can then be used to initially start the hole in an aligned position, and the drill press will then hold the proper alignment of the tap in the hole. Once the hole tap has been started in an aligned position, the dowel pin is removed and the hole tap can be completed with the ratchet and socket.

In at least one embodiment the elongated body of the drive shank is formed from hexagonal steel bar stock.

In at least one embodiment the ratchet driven tool for tapping a hole, the tap tool is provided with a coating or plating color, the color selected according to type of thread the tool is adapted to cut, specifically an ESA tap tool is red, a metric tap tool is white, and a NPT tap tool is blue, such that the colors make identification of different tap thread standards easier.

In one embodiment, the ratchet driven tool for tapping a hole is provided as a component of a set having six tap tools, the tap tools in standard ESA sizes of ¼ inch, 5/16 inch, 3/8 inch, 7/16 inch, ½ inch and 5/8 inch, with the tap tool coating.

In one embodiment, the ratchet driven tool for tapping a hole is provided in a set having five tap tools, the tap tools in standard metric mm sizes of M6, M8, M10, M12, and M16, with the tap tools having a white anodized coating.

In one embodiment, the ratchet driven tool for tapping a hole is provided in a set having six tap tools, the tap tools in standard NPT sizes of 1/8 inch, ¼ inch, 3/8 inch, ½, ¾ inch and 1 inch, with the tap tools having a blue anodized coating.

It is an objective of the inventive disclosure made herein to provide a ratchet driven tool for threading the sidewall of a bored hole that overcomes the limited leverage available from conventional tap tool drive means, including the 'T' handle variety. As discussed earlier, this limited leverage is problematic particularly when tapping hard materials or when the bore hole is undersized for example, as well as in other cases. The improved leverage of the present inventive disclosures reduces the effort required to twist the tap tool threading the hole.

It is another objective of the inventive disclosure made herein to provide a ratchet driven tool tap tool that permits the threading of holes which are located near obstructions such as a wall or located in a tight corner. Conventional 'T' handle tap tool holders and drivers can fail to be of use in such circumstances when the 'T' handle collides with the obstruction. By use of the adaptive shank of the present invention together with the tap tool, the tap tool can be driven by a socket and ratchet set, together with socket extensions of such sets when necessary, to permit tapping such a hole located near an obstruction.

It is another objective of the inventive disclosure made herein to provide adaptive drive shanks in various sizes accepting standard size tap tools such as to adapt the tap tools to be driven by a socket set ratchet drive.

It is another objective of the inventive disclosure made herein to provide a ratchet driven tool tap tool that is adapted to be driven by a conventional socket ratchet set and thereby eliminates the need to purchase a special purpose tap tool driver when a conventional socket and ratchet set is already available.

These and other objects of the invention made herein will become readily apparent upon further review of the following specification and associated drawings.

BRIEF DESCRIPTION OF THE DRAWINGS

The drawings show a form of the invention that is presently preferred; however, the invention is not limited to the precise arrangement shown in the drawings.

DETAILED DESCRIPTION OF THE DRAWINGS

In preparation for explaining the details of the present inventive disclosure, it is to be understood by the reader that the invention is not limited to the presented details of the construction, materials and embodiments as illustrated in the accompanying drawings, as the invention concepts are clearly capable of other embodiments and of being practiced and realized in various ways by applying the disclosure presented herein.

Figure 1:
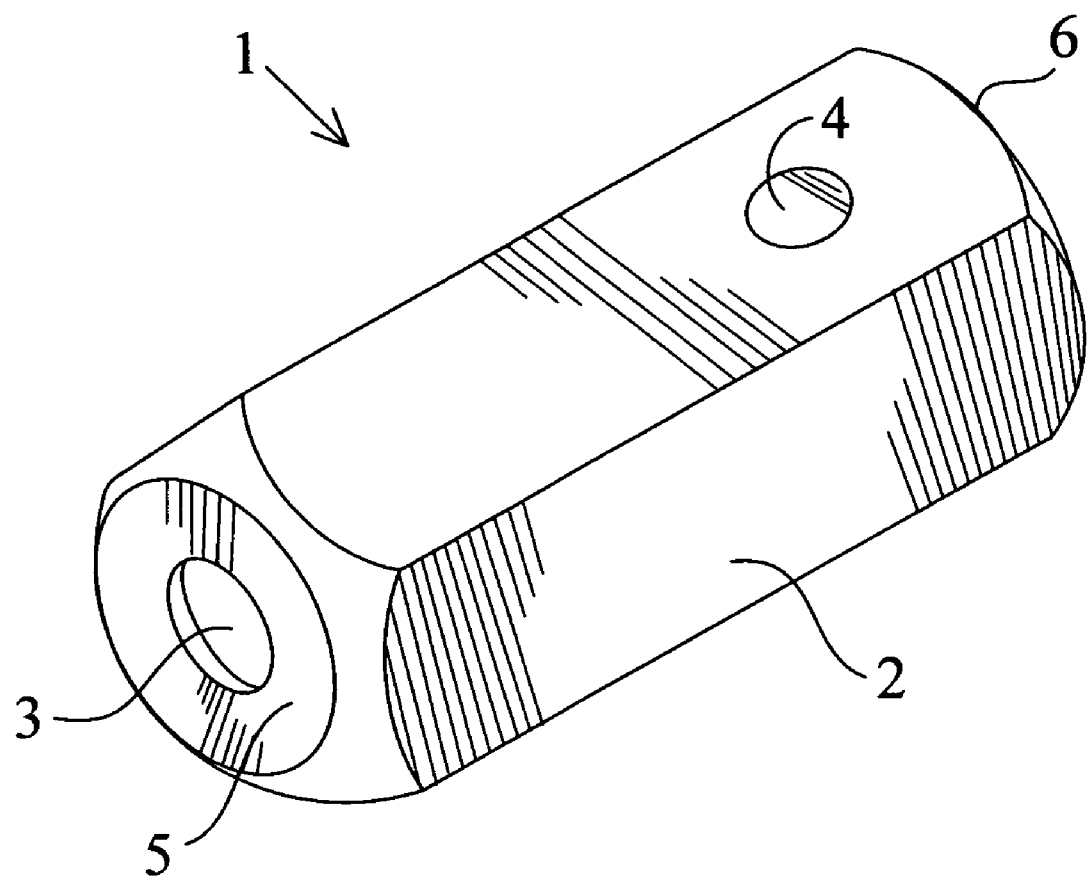
FIG. 1 presents a perspective view of one embodiment of the adaptive drive shank for adapting a cutting tap tool to be driven by a racket and socket in accordance with the inventive disclosures herein.

FIG. 1 depicts a perspective view of one embodiment of the adaptive drive shank for adapting a cutting tap tool to be driven by a racket and socket in accordance with the inventive disclosures herein. The adaptive drive shank 1 has an elongated hexagonal shank body 2. A cylindrical hole 3 or void for receiving the shank of a tap tool into the adaptive shank 1 is provided on the tap tool facing end of the adaptive drive shank. The opposing end of the adaptive shank is hexagonal in shape so that the opposing end of the hexagonal body forms a hexagonal drive head 6, the hexagonal drive head is sized to engage with and be driven by a conventional standard size socket of a socket and ratchet set. Set screws 4 are provided on opposing sides of the adaptive shank and positioned to compressively and frictionally engage a tap square drive head, once inserted. The illustrated adaptive drive shank has a hexagonal body sized to engage with and be driven by a nominally 1 inch socket, although it is to be understood that this disclosure is not limited to the described size of the drive head and socket and is instead applicable to adaptive drive shanks and sockets of any dimensional size or measurement standard such as metric.

Figure 2:
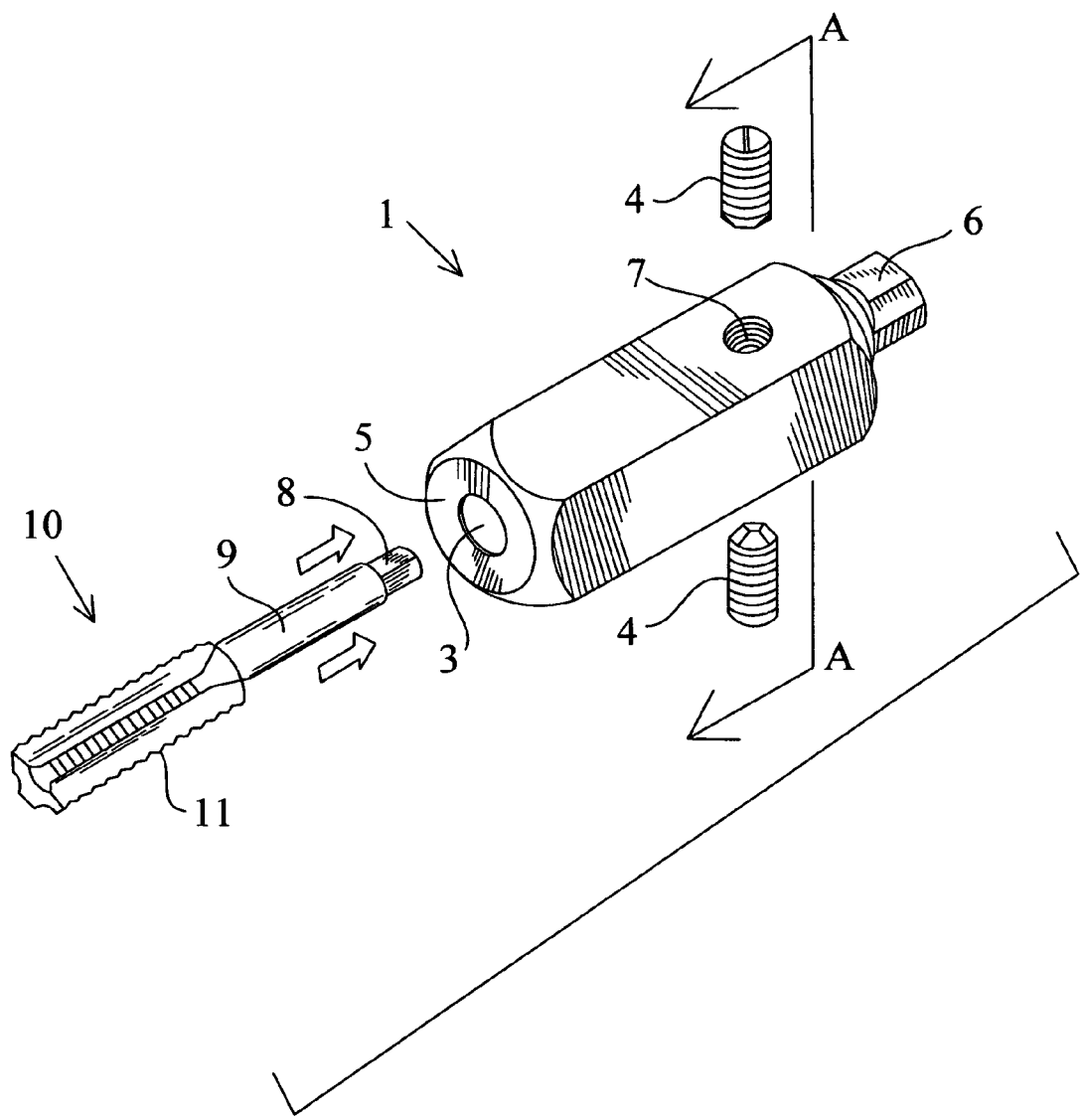
FIG. 2 presents a perspective view of another embodiment of the adaptive drive shank together with a thread cutting tap tool in accordance with the inventive disclosures herein.

FIG. 2 depicts a perspective view of another embodiment of the adaptive drive shank together with a thread cutting tap tool in accordance with the inventive disclosures herein. The adaptive drive shank 1 has an elongated hexagonal shank body 2. A cylindrical hole 3 or void for receiving the shank of a tap tool into the adaptive shank 1 is provided on the tap tool facing end 5 of the adaptive drive shank 1. A hexagonal drive head 6 is secured to the driven end of the hexagonal shank body. The drive head is sized and adapted to engage with and be driven by a standard size hexagonal socket of a socket ratchet wrench tool. Two threaded holes 7 are provided through opposing sidewalls of the adaptive shank body 1 and extending into the shank receiving hole 3, the threaded holes are located near the driven end of the hexagonal shank body. Set screws 4 are sized and threaded to be threadably received into the two threaded holes 7. The threaded set screw holes 7 are positioned to compressively and frictionally engage against the square drive head 8 of a tap tool 10, once the tap shank 9 and head 8 are inserted into the adaptive shank 1 through the cylindrical tap shank receiving hole 3. The tap tool includes a thread cutting portion 11 secured to an opposing end of the shank 9 from the square drive head 8.

Figure 3:
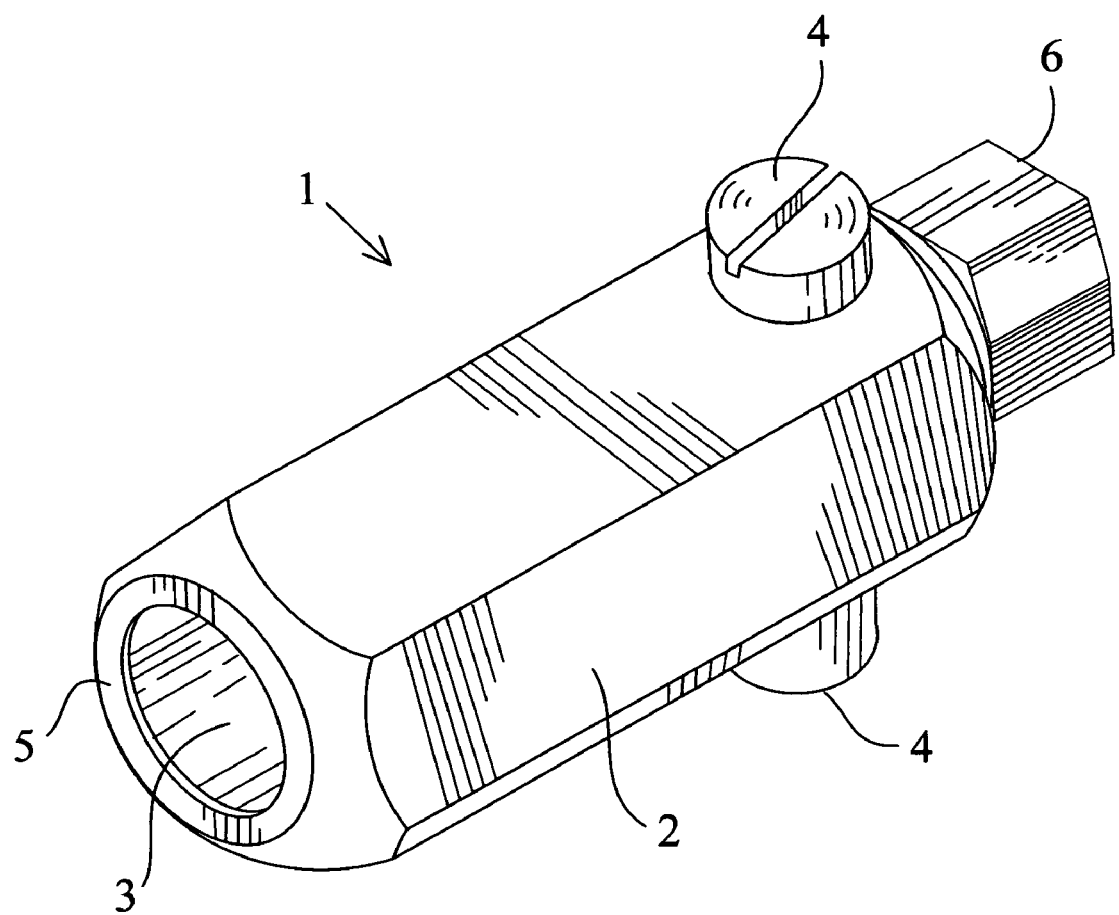
FIG. 3 presents a perspective view of another embodiment of an adaptive drive shank for adapting a larger size cuffing tap tool to be driven by a racket and socket in accordance with the inventive disclosures herein.

FIG. 3 depicts a perspective view of another embodiment of an adaptive drive shank for adapting a larger size cutting tap tool to be driven by a racket and socket in accordance with the inventive disclosures herein. The adaptive drive shank 1 has an elongated hexagonal shank body 2. A cylindrical hole 3 or void for receiving the shank of a tap tool into the adaptive shank 1 is provided on the tap tool facing end 5 of the adaptive drive shank 1. A hexagonal drive head 6 is secured to the driven end of the hexagonal shank body, the drive head is sized and adapted to engage with and be driven by a standard size hexagonal socket of a socket ratchet wrench tool. Two threaded holes 7 are provided through opposing sidewalls of the adaptive shank body 1 and extending into the shank receiving hole 3, the threaded holes are located near the driven end of the hexagonal shank body. Two set screws 4 are threadably received into the two threaded holes located on opposing sizes of the hexagonal adaptive drive shank body 2. The set screws 4 are positioned to be capable of compressively and frictionally engaging the square driving head of a tap tool. The adaptive drive shank is adapted to receive and drive larger size thread cutting tap tools.

Figure 4:
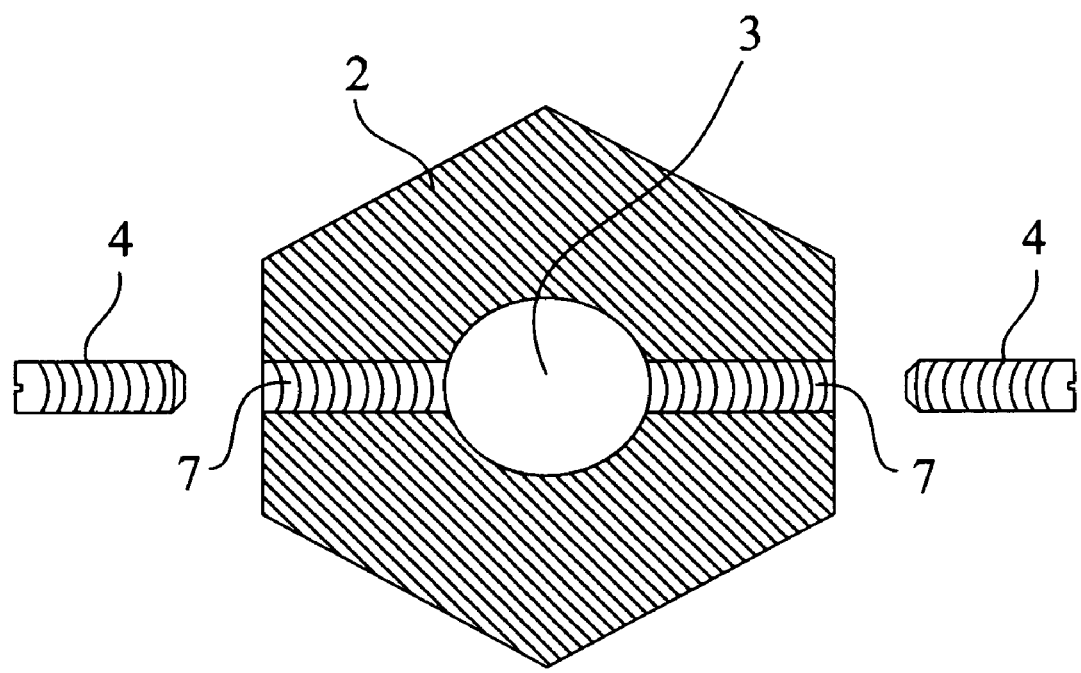
FIG. 4 presents a cross sectional view of one embodiment of the adaptive drive shank showing the set screws for holding the tap tool.

FIG. 4 depicts a cross sectional view along cutting lines A-A of FIG. 2 of the adaptive drive shank showing the set screws for holding the tap tool. The hexagonal adaptive drive shank body 2 is provided with two opposing threaded holes 7 through opposing sidewalls of the adaptive shank body 2 and extending into the shank receiving hole 3 so as to be compressively and frictionally engagable against the square drive head of a thread cutting tap tool so as to positionally and rotationally lock the tap tool body to the adaptive drive shank.

Figure 5:
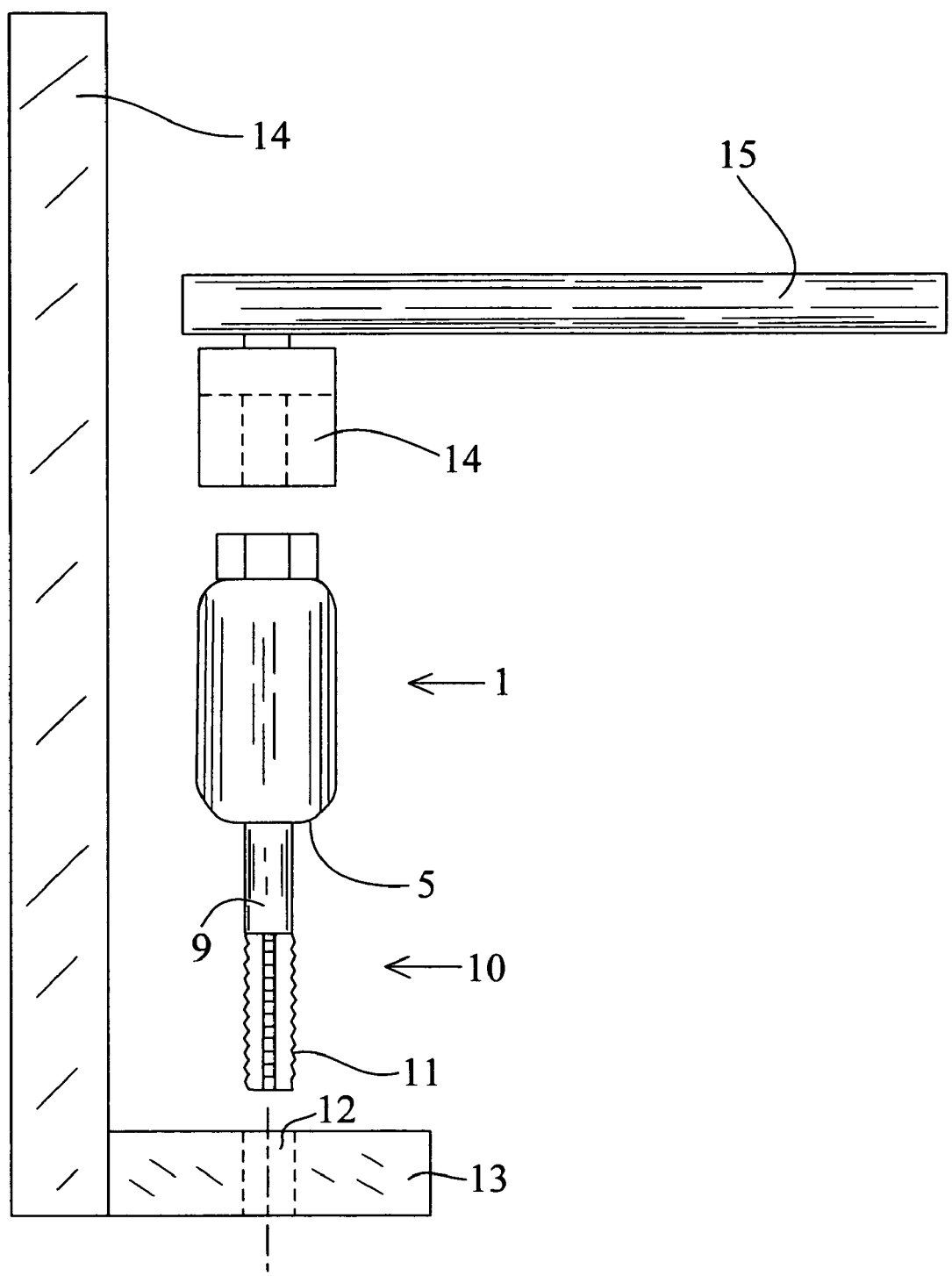
FIG. 5 presents a side view of one embodiment of the adaptive drive shank together with a tap tool and a conventional ratchet and socket drive means.

FIG. 5 depicts a side view of one embodiment of the adaptive drive shank together with a tap tool and a conventional ratchet and socket drive means. The shank portion 9 of thread cutting tap tool 10 is received into and lockably engaged into the tap tool side 5 of adaptive drive shank 1. The tap tool has a thread cutting portion 11 positioned above a bore hole 12 to be threaded in a work piece 13. A conventional and standard size hex drive socket 14 and conventional ratchet drive 15 are positioned to engage with the hexagonal drive head 6 of the adaptive drive shank 1. The extended handle of the ratchet 15 provides additional leverage that overcomes the limited leverage available from conventional tap tool drive means including the 'T' handle variety. As discussed earlier, this limited leverage is problematic particularly when tapping hard materials or when the bore hole is undersized for example, as well as in other cases. The improve leverage of the present inventive disclosures reduces the effort required to twist the tap tool threading the hole. The hole to be tapped is located proximate to an obstacle, in this case a wall 16. A drawback of conventional 'T' handle tap tool holders is that the 'T' handle prevents the tapping of holes which are near obstacles, such as the wall 16, that would prevent the 'T' handle from freely rotating without hitting an obstruction. The ratchet driven tool for tapping a hole of the present inventive disclosures overcomes this drawback of the prior art by providing a ratchet driven thread cutting tool adapted for use in tight corners or against obstructions and walls, as illustrated in FIG. 5.

Figure 6:
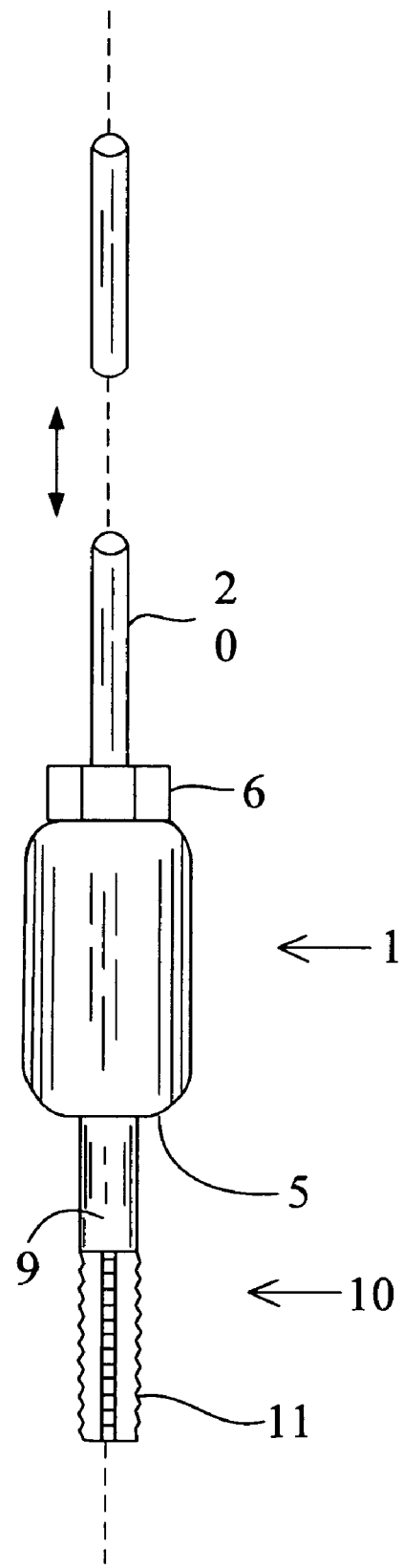
FIG. 6 presents a side view of one embodiment of the adaptive drive shank together with a tap tool, illustrating the removable dowel pin.

FIG. 6 presents a side view of one embodiment of the adaptive drive shank together with a tap tool, illustrating the removable dowel pin. Dowel pin 20 is sized to tightly and removably be received into a precision bore in the hexagonal drive head 6. The bore and dowel pin sized to achieve a tight tolerance precision fit when the dowel pin is inserted into the precision bore in the drive head 6. The dowel pin 20 is sized to have approximately ¼ of its length outside the drive head after insertion. The dowel pin is an aid to starting the hole tap in a properly aligned orientation. When starting a hole, the dowel pin may be inserted into the chuck of a drill press and the opposing end of the dowel pin is inserted into the precision fit bore of the drive head. The drill press can then be used to initially start the hole in an aligned position, and the drill press will then hold the proper alignment of the tap in the hole. Once the hole tap has been started in an aligned position, the dowel pin is removed and the hole tap can be completed with the ratchet and socket. The dowel pin 20 is removable, and is illustrated in an alternate position 21 after removal from the hexagonal drive head.

The discussed construction, illustrations and sequence of operation is for one embodiment of the invention, but is in no way limiting to other embodiments. The operating modes may be changed and enhanced without deviating from the intention of this inventive disclosure.

In the preceding detailed description, reference has been made to the accompanying drawings that form a part hereof, and in which are shown by way of illustration specific embodiments in which the invention may be practiced. These embodiments and certain variants thereof have been described in sufficient detail to enable those skilled in the art to practice the invention. It is to be understood that other suitable embodiments may be utilized and that logical, material, and mechanical changes may be made without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents as can be reasonably included within the spirit and scope of the appended claims.

What is claimed is:

1. A ratchet driven tool for tapping a hole comprising:
 a thread cutting tap tool for cutting circumferential threads into wall of a hole, the tap tool comprising an elongated body having a thread cutting portion proximate a first end, a square drive head secured to an opposing second end, and a shank portion interposed between and joining the thread cutting portion and the square drive head; wherein the tap tool has a color selected according to type of thread the tool is adapted to cut, wherein a ESA tap tool has is red, a metric tap tool is white and a NPT tan tool is blue;
 an adaptive drive shank comprising:
  an elongated shank body having a tap shank receiving hole through a tap tool side of the body and two threaded holes through opposing sidewalls of the shank body and extending into the shank receiving hole, the threaded holes proximate an opposing driven end of the shank body, the receiving hole sized to receive the square drive head and shank portion of the tap tool body therein;

two set screws, one for each threaded hole, the set screws sized and adapted to be threadably received into the threaded holes of the shank body, the screws compressively and frictionally engageable against the square drive head so as to positionally and rotationally lock the tap tool body of the drive shank;

a hexagonal drive head having a precision hole for receiving a dowel pin, the hexagonal drive head secured to the driven end of the elongated shank body, the drive head sized and adapted to engage with and be driven by a hexagonal socket of a socket ratchet wrench, wherein the socket wrench provides leveraged torque to drive the tap tool to cut the circumferential threads, wherein the thread cutting tool is adapted for threading a hole proximate a tight corner, wall or other proximate obstruction, wherein the dowel pin is used to align the shank and tap tool and start the hole in a drill press after which the dowel pin is removed and socket wrench applied to finish tapping the hole.

2. The ratchet driven tool of claim 1, wherein the drive shank comprises 1020 cold rolled hexagonal steel stock.

3. The ratchet driven tool of claim 1 wherein the drive shank has a length between 1.5 and 2 inches, the set screws comprise ⅜ inch diameter 16 threads per inch.

4. The ratchet driven tool of claim 3, wherein the elongated shank body is formed from metallic hexagonal bar stock.

5. The ratchet driven tool of claim 4, wherein the adaptive drive shank is provided in a plurality of sizes, each size adapted to a standard size of available tap tools.

6. The ratchet driven tool of claim 1, wherein the tap tool color is provided by an anodized coating fixed onto the tap tool body.

7. The ratchet driven tool of claim 6, wherein the hexagonal drive head of the drive shank is adapted to fit a socket size selected from the set of ¾ inch, 1 inch, and 1.25 inches.

8. The ratchet driven tool of claim 6, wherein the dowel pin has a diameter of ¼ inch and a length of between 1 to 1-½ inches.

9. The ratchet driven tool of claim 7, wherein the ratchet driven tool for tapping a hole is provided in a set having six tap tools, the tap tools in standard ESA sizes of ¼ inch, 5/16 inch, ⅜ inch, 7/16 inch, ½ inch and ⅝ inch, wherein the tap tools have a red anodized coating.

10. The ratchet driven tool of claim 7, wherein the ratchet driven tool for tapping a hole is provided in a set having five tap tools, the tap tools in standard metric mm sizes of M6, M8, M10, M12, and M16, wherein the tap tools have a white anodized coating.

11. The ratchet driven tool of claim 7, wherein the ratchet driven tool for tapping a hole is provided in a set having six tap tools, the tap tools is standard NPT sizes of ⅛ inch, ¼ inch, ⅜ inch, ½ inch ¾ inch and 1 inch, wherein the tap tools have a blue anodized coating.

* * * * *